United States Patent [19]

Fan

[11] Patent Number: 5,027,078

[45] Date of Patent: Jun. 25, 1991

[54] UNSCREENING OF STORED DIGITAL HALFTONE IMAGES BY LOGIC FILTERING

[75] Inventor: Zhigang Fan, Webster, N.Y.

[73] Assignee: Xerox Corporation, Stamford, Conn.

[21] Appl. No.: 419,517

[22] Filed: Oct. 10, 1989

[51] Int. Cl.$^5$ .............................................. H04N 1/40
[52] U.S. Cl. ................................... 358/456; 358/455; 358/448
[58] Field of Search ............... 358/455, 456, 457, 458, 358/448, 465, 466; 382/50, 51, 52, 53, 54

[56] References Cited

U.S. PATENT DOCUMENTS 4,630,125 12/1986 Roetling .............................. 358/280
4,841,377 6/1987 Hiratsuka et al. .................. 358/283

OTHER PUBLICATIONS

"A Survey of Electronic Techniques for Pictorial Image Reproduction", vol. Com-29, No. 12, 12/81 J. C. Stoffel/J. F. Moreland, pp. 1898-1925.

Primary Examiner—Joseph A. Orsino
Assistant Examiner—Thomas D. Lee
Attorney, Agent, or Firm—Ronald F. Chapuran; Duane C. Basch

[57] ABSTRACT

The present invention is a method of unscreening a digitally created halftone image to reconstruct a continuous tone image, including the determination of the parameters of the halftone screen used to generate the halftone image, logically filtering the halftone image to determine approximate continuous tone levels, and optionally, smoothing the continuous tone levels of the reconstructed image to minimize the quantization errors introduced during the original screening or dithering process.

9 Claims, 5 Drawing Sheets

UNSCREENING OF STORED DIGITAL HALFTONE IMAGES BY LOGIC FILTERING

BACKGROUND OF THE INVENTION

1. Field of the Invention

This invention relates generally to a system for processing digital images and more particularly to a method for obtaining a continuous tone digital image from a stored digital halftone image.

2. Description of the Prior Art

It is a generally known procedure to reverse the digital halftone process in order to approximate an original continuous tone digital image. A traditional method of reversing the halftoning process is through the application of a low-pass filter to the binary image data. The low-pass filter method, however, cannot maintain the fidelity of the edge information contained in the original image and in fact may blur edges and introduce artifacts into the continuous tone outputimage.

U.S. Pat. No. 4,630,125 to Roetling, assigned to Xerox Corporation, discloses a method of reconstructing a continuous tone image of greyscale values that have been converted to a halftone image of black and white spots. The method of reconstruction involves isolatinf each spot of a halftone image along with a neighborhood of surrounding spots, and for each neighborhood comparing a maximum screen pattern value producing a white spot with a minimum screen value producing a black spot. If the minimum screen value giving a black spot is greater than the maximum screen value giving a white spot, then the greyscale pixel value of the isolated spot is the average of the maximum and minimum screen values just described. If the minimum screen value giving a black spot is less than the maximum screen value giving a white spot, then the process is repeated after deleting that portion of the neigborhood of surrounding spots containing the maximum or minimum screen value furthest from the isolated spot.

U.S. Pat. No. 4,841,377 to Hiratsuka et al discloses a method for estimating an original continuous tone image from a stored binary image. The method involves, inter alia, setting a plurality of scanning apertures in a binary image formed of a dither matrix, selecting one scanning aperture satisfying a predetermined condition for each picture element of a continuous image to be estimated, and estimating the continuous image on the basis of the number of white or black picture elements in the scanning aperture selected.

It should be appreciated that the halftoning process includes a loss of information, and therefore, it is impossible to exactly reverse the halftoning process and achieve a continuous tone image identical to the original. However, just as a halftone or dithered digital image gives a visual impression of a grey, it should be possible to approximate the original continuous tone digital image using reconstructive methods.

A drawback of the Roetling method of reconstructing the continuous tone image from a halftone image is that the method assumes that the halftone screen parameters are known initially. In addition, the Roetling approach uses a fixed size initial neighborhood and does not select the neighborhood adaptively, for instance, according to image content.

It is an object of the present invention, therefore, to provide a new and improved method for unscreening a halftone digital image, including the process of determining the parameters of the halftone screen or dither matrix used, and the process of reducing the appearance of coarse quantization artifacts introduced during the halftoning process. It is a further object of the present invention to produce a continuous tone output image of substantially better detail than possible using prior art methods. It is also an object of the present invention to provide a flexible unscreening algorithm capable of incorporating additional functionality so as to enable customization of the unscreening process according to the output effects desired, for example, modification of the tonal reproduction curve (TRC) used to produce the continuous tone output image.

Further advantages of the present invention will become apparent as the following description proceeds and the features characterizing the invention will be pointed out with particularity in the claims annexed to and forming a part of this specification.

SUMMARY OF THE INVENTION

Briefly, the present invention is a method of unscreening a digitally created halftone image to reconstruct a continuous tone image, including the determination of the parameters of the halftone screen used to generate the halftone image, logically filtering the halftone image to determine approximate continuous tone levels, and optionally, smoothing the continuous tone levels to minimize the quantization errors introduced during the halftoning process.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
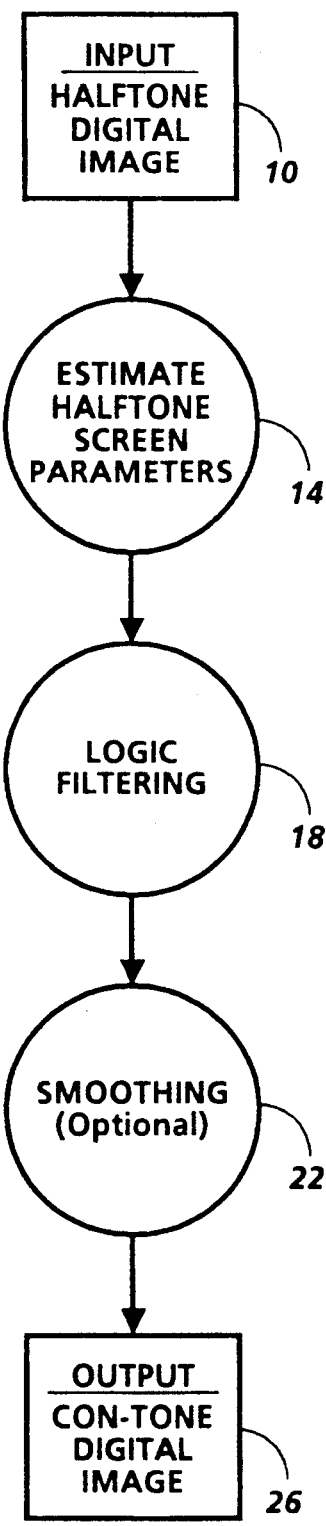
FIG. 1 is a block diagram illustrating the major steps in the unscreening process in accordance with the present invention.

For a general understanding of the features of the present invention, reference is made to the drawings. Referring to FIG. 1, there is shown a block diagram illustrating the major processing blocks of the unscreening algorithm. Processing block 14 represents the process of estimating the parameters of the halftone screen applied to the original continuous tone digital image, as determined from halftone digital input image 10.

Knowledge of the halftone screen parameters enables the subsequent analysis of the halftone image. In logic filtering process block 18, the halftone image is decomposed to a pixel level, analyzed to allow approximation of the original continuous tone pixels, and recombined into a continuous tone image. An optional smoothing process, block 22, may be employed to eliminate the coarse quantization artifacts caused by the original halftoning process. These artifacts are evident within the slowly varying grey areas of the logic filter continuous tone output image. Finally, the image is output as a continuous tone, or con-tone, image 26 which approximates the original continuous tone image.

In order to correctly unscreen a halftone digital image, it is necessary to determine certain parameters of the original halftone screen used in generating the halftone image. Specifically, the dimensions of the halftone cell must be known in two directions, as well as the shift parameter and halftone dot threshold values. Should the screen parameters be known, the process of estimating screen parameters, FIG. 1 process block 14, may be eliminated. If the halftone screen parameters are not known, they must be estimated through analysis of the halftone image.

Figure 2:
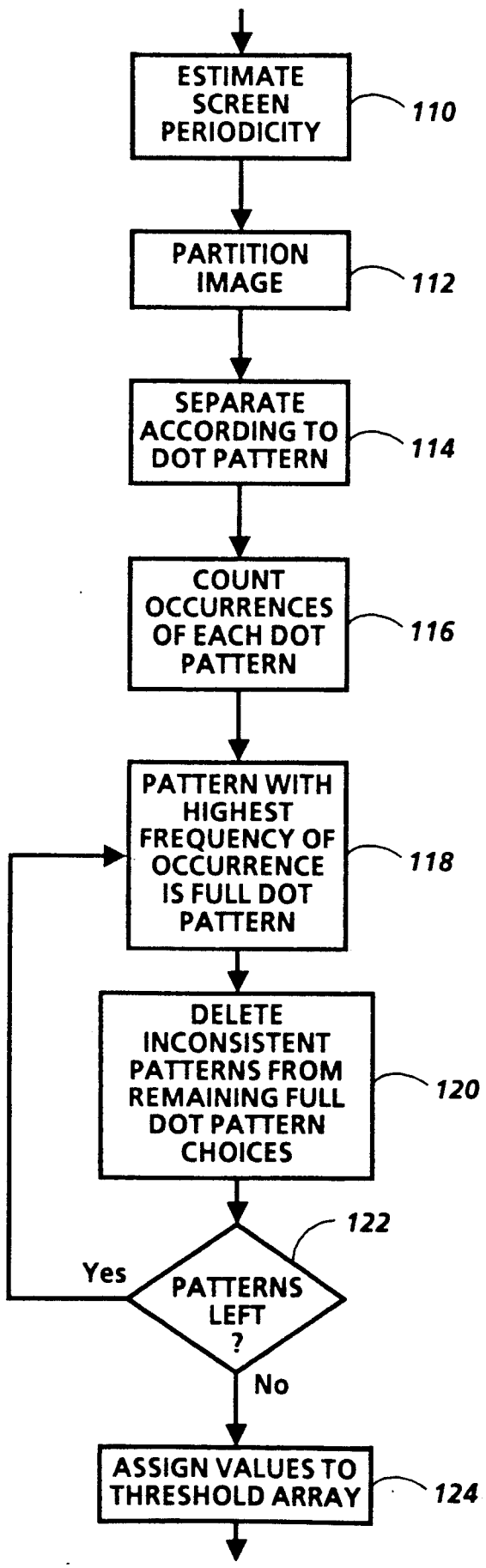
FIG. 2 is a detailed flowchart of the algorithm used to determine the screen parameters.

Referring now to FIG. 2, which illustrates the algorithm used to approximate the screen parameters. Initially, the dimensions of the halftone cell and shift parameter of the screen must be estimated, block 110, as the periodicity forms the basis for the subsequent decomposition of the halftone image.

The halftone cell dimensions, in both the x and y direction, are referred to as $M_x$ and $M_y$ respectively. The cell dimensions, $M_x$ and $M_y$ are approximated using a traditional approach, by estimating an autocorrelation function of the halftone digital image data. For example, see the article in IEEE Transactions on Communications, Vol. COM-29, No. 12, Dec. 1981, titled "A Survey of Electronic Techniques for Pictorial Image Reproduction". The output of the estimated autocorrelation function is analyzed to determine where the dominant, non-origin peaks of the function occur, which are indicative of the halftone cell dimensions, $M_x$ and $M_y$. In addition, the screen shift parameter ($\Theta$) can be approximated based on the relative coordinate locations of the autocorrelation peaks. The halftone parameter information is then used to determine the relative location of each image pixel within the halftone cell. This positional information is eventually required to characterize an initial greyscale range for each halftone image pixel.

Once known, the $M_x$ and $M_y$ parameters are used to determine the number of distinct levels L within the halftone cell as given by the expression:

$$L = (M_x * M_y) + 1. \quad (1)$$

The number of levels L determines the range of the set of possible threshold values (T) for the halftone cell as illustrated in the following expression:

$$T = \{1, 2, 3 \ldots (L-1)\}, \quad (2)$$

Subsequent modification of the threshold value set T is possible through the use of a modifying function. Examples include, but are not limited to, modification to achieve expansion of the continuous tone output range or modification to skew the TRC mapping of the continuous tone output.

Knowledge of the halftone cell dimensions enables decomposition of the halftone image to determine the approximate threshold value of each halftone dot location within the halftone cell. Referring still to FIG. 2, the image is partitioned, block 112, into cells of $M_x$ by $M_y$ dimension and the halftone dot pattern, or simply dot pattern, of each of these cells is determined. The dot pattern being defined as the arrangement of black and white pixels within a halftone cell. All unique dot patterns are categorized, block 114, and the number of occurrences of each of the patterns is recorded by block 116, in a histogram fashion.

The next phase of the process involves determination of the full dot patterns within the range of all the unique dot patterns found. A full dot pattern is a pattern which was possibly, but not assuredly, generated by a uniform grey area in the original continuous tone image. Conversely, a partial dot pattern was formed over a non-uniform area of the original continuous tone image. In typical halftone images, there is only one full dot pattern for each grey level, neglecting effects caused by a possible phase shift. Furthermore, there is known to be a relationship between full dot patterns and the halftone threshold array, such that full dot patterns that differ by a single dot can be used to determine the halftone dot position of the next halftone level. More specifically, the differing dot position, between a level K and a level K+1 halftone full dot pattern, indicates the dot position where the halftone cells differ for adjacent continuous tone input levels. This indication combined with the knowledge of the set of possible halftone threshold values T, allows a one-to-one mapping of the halftone dot positions to the halftone threshold values.

The technique employed in determination of the full dot patterns is represented by blocks 118, 120 and 122. Initially, the dot pattern with the highest number of occurrences is selected as a full dot pattern, block 118. This step is based on the assumption that the halftone dot patterns within the digital halftone image are dominated by full dot patterns. If this assumption is invalid, it is an indication that the original continuous tone image contains many edges and the halftone screen used was insufficient to accurately represent the original image. This results in a poor quality halftone image, and therefore, a low quality continuous tone output image would be expected using a process according to the present invention or any prior art method.

Figure 4A:
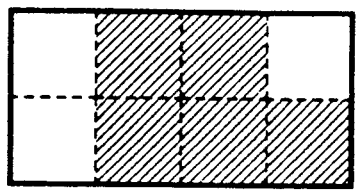
FIGS. 4a, 4b, 5b and 5c are illustrations of halftone cells with representative dot patterns for illustration of the halftone parameters determination techniques in accordance with the present invention.
Figure 4B:
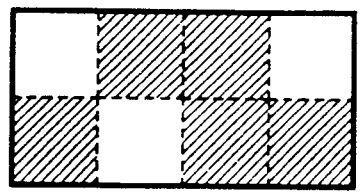

Subsequent to identifying the full dot pattern in block 118, all dot patterns inconsistent with the current full dot pattern are deleted from the remaining dot patterns, as represented by block 120. Referring briefly to FIG. 4, which depicts a 4×2 halftone cell where the black pixels are shown shaded. Inconsistent dot patterns include those which have the same number of dots in the halftone cell area as the full dot pattern FIG. 4a, but where the dots are arranged in a pattern differing from that of the full dot pattern, such as in FIG. 4b.

Figure 5A:
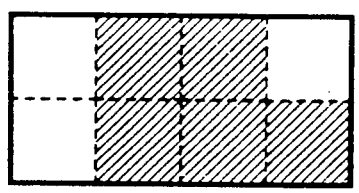
Figure 5B:
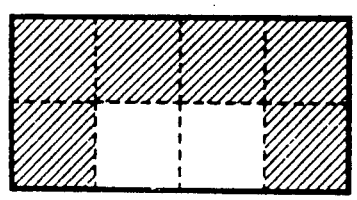
Figure 5C:
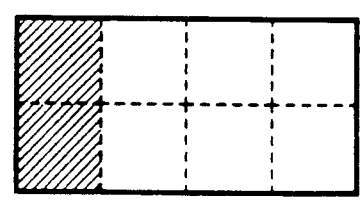

Inconsistent dot patterns also include dot patterns which are contradictory to the full dot patterns, but not necessarily of the same level (L). In order to be consistent with a full dot pattern of level L, a pattern of a lower level (<L) must be comprised of a subset of the dots within the full dot pattern. Furthermore, a higher level dot pattern (>L) must include all of the dots of a lower level full dot pattern. Referring now to FIG. 5, where FIG. 5a represents the full dot pattern, and FIGS. 5b and 5c illustrate inconsistent patterns. The dot patterns of FIGS. 5b, c clearly contain different numbers of black cells, however, they are obviously inconsistent with the pattern established by the full dot pattern of FIG. 5a.

Once again referring to FIG. 2, the process of eliminating the non-full dot patterns is continued until all patterns have either been classified as full dot patterns or eliminated due to inconsistencies. The looping structure of the algorithm is represented by test block 122, where successive iterations are controlled until all dot patterns are detected. Subsequently, block 124 uses a mapping function to logically assign the threshold values (T) to dot positions within the halftone cell by determining the dot positions which change between adjacent levels of halftone full dot patterns and using the number of dots as a relative index to the particular threshold value element in set T.

An alternative method of determining the halftone cell dot patterns includes blocks 110, 112 as previously discussed. Subsequent processing characterizes each dot position within the cell by counting the number of occurrences of the black or "on" dots in the respective positions. The halftone cell is then estimated by assigning the dot position with the most black dots the lowest threshold value ($T_0$), the next most frequent dot position the next most threshold value ($T_1$), and so on until the least frequent black dot position is assigned the highest threshold value ($T_{L-2}$).

This alternative method results in a more efficient manner of execution, however, empirical results have shown it to be less accurate than the method incorporated within the present invention, as previously discussed and shown in FIG. 2.

Following determination of the halftone screen parameters, the next step in the unscreening algorithm is the logic filtering step as represented by block 18 in FIG. 1. A general mathematical form of the logic filter is represented by the expression:

$$x[k] = \cap_{i \in N_b} C_i * y[k+i]. \qquad (3a)$$

where the input $y[k+i]$ and output $x[k]$ are both ranges specified by their upper an lower bounds, b and a respectively, in the form (a,b), where:

$$(a_1,b_1] \cap (a_2,b_2] = \begin{cases} (\max(a_1,a_2), \min(b_1,b_2)], & \text{if } b > a \\ \{\} \text{ (empty set)}, & \text{if } b <= a. \end{cases} \qquad (3b)$$

Indices k and i represent 2-dimensional vectors in the case of a 2-D logic filter, or scalars for a 1-D logic filter and $N_b$ specifies a neighborhood set. $C_i$ is a scaling factor which enlarges or reduces the range of (a,b) according to the expression:

$$c_i*(a,b] = (((1+c)a/2 + (1-c)b/2), ((1-c)a/2 + (1+c)b/2)], \qquad (3c)$$

with the effect of controlling the amount of noise that will be allowed to pass through the filter during generation of the resulting continuous tone data range.

Specifically, an example 1-dimensional logic filter is represented by the following expression:

$$y'[k] = \begin{cases} y[k] \cap y[k+i], & \text{if } y[k+i] \cap y[k] \neq \{\} \\ y[k], & \text{otherwise} \end{cases} \qquad (4)$$

where $y'[k]$ represents a further refinement of the range indicated by $y[k]$ and $i = +1$ or $-1$. Also, the empty range $\{\}$ indicates a conflict between the operators, which is indicative of a nonuniformity, as might be caused by an edge in the continuous tone original image. The physical meaning of expression 4 is best described as a reduction in the range at point k based on a combination of information from point k and a neighboring location $k+i$, when no nonuniformity is detected.

Subsequent processing with the 1-D filter would normally include iteration on the same pixels, using different values for i, until convergence of the greyscale range for each pixel within a uniform area. This manner of iteration will eventually allow each pixel to obtain information from multiple neighbors and to converge to a stationary greyscale range after several iterations.

Figure 3A:
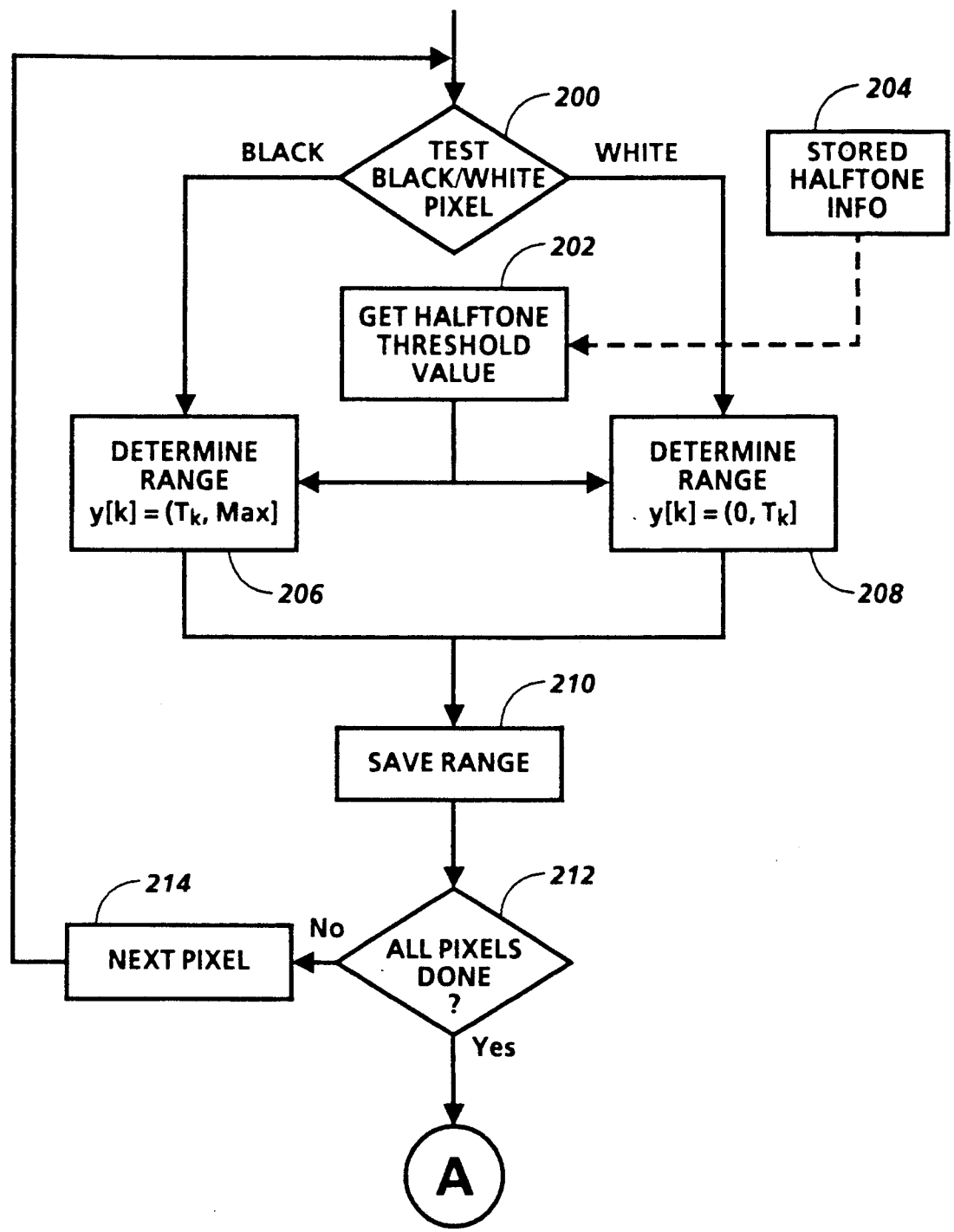
FIGS. 3a and 3b are detailed flowcharts of the algorithm used for the logic filtering of the halftone image pixels.
Figure 3B:
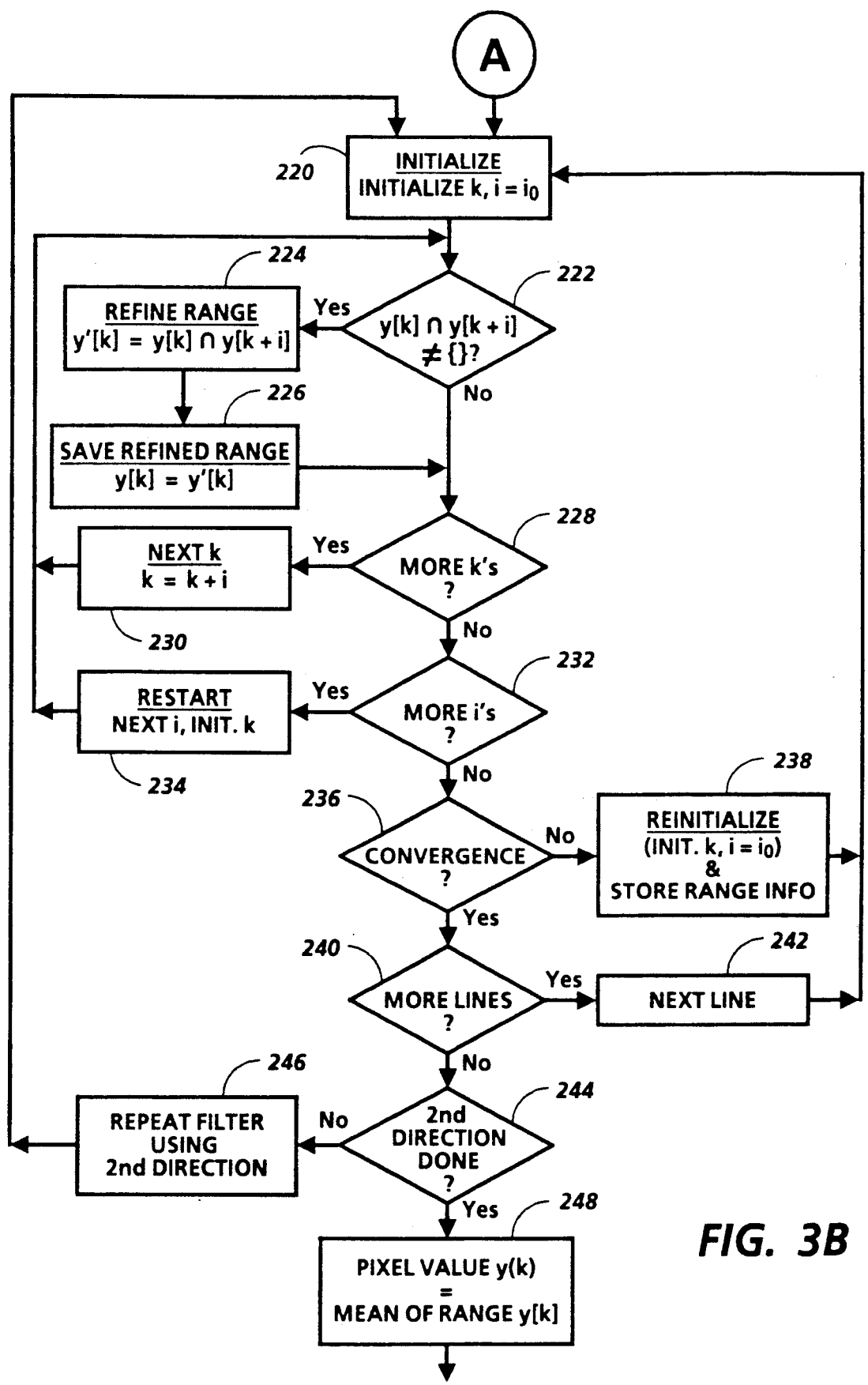

Referring now to FIGS. 3a and 3b, which illustrate a flowchart of the simplified 1-dimensional logic filtering algorithm in accordance with the present invention. The logic filtering process is initialized by determining the range of possible greyscale values for each image pixel, as illustrated in FIG. 3a. Specifically, each pixel is first tested to determine its pixel state, block 200, as represented by its characterization as either black or white. Block 202 retrieves the appropriate halftone threshold value from the stored halftone information memory 204, using the relative position of the current pixel within a halftone cell as an index within the memory.

Depending upon the state of each pixel, subsequent processing is carried out in block 206 or 208 to establish an initial range for the current pixel. If the pixel is characterized as black or "on", the halftone threshold ($T_k$) will establish the minimum value for the initial greyscale range of the pixel, block 206. If the pixel is characterized as white or "off", $T_k$ will establish a greyscale range maximum value, block 208. The output range of blocks 206, 208 is stored for later use, as indicated by block 210. Next, test block 212 checks if each input image pixel has been initialized with a greyscale range. If not, block 214 selects an uninitialized pixel and the initialization process is repeated until the all pixels within the halftone input image are initialized, as determined by test block 212.

Subsequently, the process of FIG. 3b is used to logically filter the input pixel ranges and refine them to allow a more accurate representation of the original con-tone image. Specifically, control variables are first initialized in block 220. The next step of the process involves comparison of the current and neighbor pixel ranges to determine if an intersection exists.

Test block 222 represents the test for intersection of the two ranges. If an intersection is detected in test block 222, processing is continued in block 224, where the new range of the current pixel $y'[k]$ is modified to represent the reduced range represented by the intersection of the current pixel range $y[k]$ and a neighboring pixel range $y[k+i]$. This modified range, $y'[k]$, is subsequently saved as a new range for the current pixel $y[k]$, as illustrated by block 226. If no intersection were detected in block 222, the range of the current pixel would be unchanged. Also, nonintersecting ranges may be an indication that the current pixel resides in an area of non-uniformity within the original continuous tone image which precludes the use of neighboring pixel information for refinement of the greyscale range.

The structure of the logic filter algorithm, in accordance with the present invention, includes an innermost loop to first filter all pixels within a scanline using the same relative neighboring pixel location. The test for this innermost loop is contained in test block 228, where pixel count (k) is tested to determine if all pixels within a scanline have been processed with the current relative neighboring pixel position (i).

If additional pixels remain to be processed, block 230 acts to enable their processing by indexing pixel count (k) and repeating blocks 220 through 228. If however, all pixels have been processed, block 232 is activated to determine that all relative neighboring pixels (i) have been included in the filtering process for this scanline. Again, if all neighboring positions have not been included, a new relative neighbor position (i) is selected and the pixel count variable (k) is reinitialized by block 234, and processing is continued at block 220. This secondary loop, as provided by blocks 232 and 234 assures that the filter is applied with all relative neighboring positions (i).

Upon completion of the inner scanline processing loops, the process applies a test for convergence of the greyscale range of individual pixels at test block 236. The convergence test comprises a comparison of the pixel greyscale ranges of the most recent iteration of the logic filter, as applied in the current 1-dimensional direction, to the pixel greyscale ranges of the previous iteration.

If the convergence test indicates that there has been a significant reduction in the continuous tone data ranges for the processed pixels, further iterations are required. Should additional iterations be required, the current con-tone ranges establish the starting ranges for the pixels within the scanline and the process is reinitialized as indicated by block 238. Implementation of the logic filter in this manner allows the neighborhood of influence for each pixel within a uniform area to be greatly expanded from that of a single pass of the filter operation.

When the ranges of all pixels within the scanline have converged to a desired level, an outer control loop is used to advance to the next scanline. Test block 240, in conjunction with block 242, is used to assure that all scanlines within the input image are processed by the inner loop of the logic filter. Successive scanlines of the halftone input image are filtered until test block 240 determines that all scanlines have been processed.

Upon successful iteration of the logic filter in a first direction, the process is repeated in a second direction. As indicated by test block 244, a test is applied to determine if the second filtering direction has been used. If not, the logic filtering process of blocks 220 through 242 is repeated as described above, using the refined pixel ranges determined during logic filtering in the initial filtering direction. If it is determined within block 244 that the logic filter has been applied in both directions, the logic filtering process is essentially complete. The remaining step, block 248, will assign a greyscale value to each con-tone output pixel equal to the average of the upper and lower range bounds as determined during the logic filtering process.

In accordance with the present invention, it is desirable to utilize the logic filtering step, block 18 of FIG. 1, in multiple initial orientations in order to analyze the effects caused by edges within the original continuous tone image. The logic filtering process is performed in several quantized directions (e.g. horizontal, vertical and along two diagonals). The resulting output images of each filter orientation are then compared to one another. The logic filtered image, whose initial filtering orientation lies along the predominant edge orientation, is chosen for the final output image as it provides maximum edge preservation.

The predominant edge orientation is determined through standard techniques which measure the variation of the image intensity along different directions. The orientation with the least variation is then considered to be the edge orientation. More specifically, the intensity variation is only calculated for one direction for each filtered image (i.e. for the resulting image initially filtered horizontally, the horizontal variation is measured). This image intensity variation is then compared to those obtained from the vertically and diagonally filtered images and the edge orientation is chosen to be the filtering orientation with the minimum amount of variation.

An alternative method of optimizing the filtering direction according to the predominance of edge orientations has been considered. Specifically, the alternative method would employ a filter, either a low-pass or a modified form of the logic filter, to first process the halftone input image to determine the predominant edge orientation within the image. Upon determining the predominant orientation, a logic filter is then applied in an initial direction parallel to the predominant edge orientation.

Subsequent to the logic filtering process of the unscreening algorithm, an optional smoothing process, block 22 in FIG. 1, may be employed to reduce the halftone quantization effects in the reconstructed continuous tone image.

While there are numerous examples of filters capable of meeting the smoothing process requirements, the present invention incorporates an adaptive filter, with a window aperture centered about a target pixel. Specifically, if the values of all pixels within the window have a variation smaller than one quantization level, then they are are averaged to determine the value for the center pixel. Otherwise, the center pixel remains unchanged. This smoothing process is then repeated for all pixels within the con-tone image, in order to reduce the quantization effects in the reconstructed continuous tone output image.

While the present invention has been described as using a 1-dimensional filtering operation applied in two distinct directions, it will be appreciated that the logic filtering operation may be equivalently implemented using a single 2-dimensional logic filtering operation. Furthermore, it will be appreciated that variations in the manner of implementation of the algorithms presented herein may be used to improve processing efficiency or the quality of the reconstructed continuous tone output image.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a system for manipulating digital halftone images represented by a plurality of pixels, each pixel having a white or black binary halftone state generated by the conversion of an original continuous tone digital image into a halftone digital image by applying a halftone screen to the original continuous tone image, the halftone screen employing a halftone cell having characteristic dimensions, a shift parameter and threshold values which define the cell, the system having a memory for digitally storing the halftone image pixels, a method of reconstructing a continuous tone digital image from a halftone digital image comprising the steps of:

estimating the cell dimensions and shift parameter of the halftone screen used to produce the halftone digital image, identifying the halftone cell threshold values based on said estimated cell dimensions, partitioning the halftone digital image into halftone cell segments according to said estimated cell dimensions and estimated shift parameter, identifying all unique halftone cell dot patterns within each of the halftone cell segments, selecting certain of said unique halftone cell dot patterns to represent full halftone dot patterns based on the frequency of occurrence of said halftone cell dot patterns and a predetermined selection scheme, determining the correspondence of said full halftone dot patterns with said halftone cell threshold values to identify the halftone cell threshold value associated with each halftone cell dot position, logically filtering the plurality of halftone digital image pixels based on an initial range derived from said halftone cell threshold values, arriving at a minimal range of potential continuous tone image values for each of said pixels through iterative application of a logical filter, determining a continuous tone output value associated with each of said pixels based on said minimal range of potential continuous tone values, and assigning each of said continuous tone output values to a corresponding pixel within the reconstructed continuous tone digital image.

2. In a system for manipulating digital halftone images represented by a plurality of pixels, each pixel having a white or black binary halftone state generated by the conversion of an original continuous tone digital image into a halftone digital image through the application of a halftone screen to the original continuous tone image, the halftone screen employing a halftone cell having characteristic parameters including; dimensions, a shift parameter and a set of cell threshold values, which define the cell, the system having a memory for digitally storing the halftone image pixels, a method of unscreening a halftone digital image comprising the steps of:

estimating the halftone cell parameters for the halftone screen used in the creation of the halftone digital image, logically filtering the plurality of halftone digital image pixels to arrive at a minimal range of potential continuous tone image values for each of said pixels, determining a continuous tone output value associated with each of said pixels based on said minimal range of potential continuous tone values, and assigning each of said continuous tone output values to a corresponding pixel within the reconstructed continuous tone digital image.

3. The method of claim 2 wherein the step of estimating the halftone screen parameters used in the creation of the halftone digital image includes the steps of:

estimating the halftone cell dimensions in both a first and second direction, the halftone cell shift parameter and the set of halftone cell threshold values of the halftone screen, partitioning the halftone digital image into a plurality of halftone cell segments according to said estimated first and second halftone cell dimensions and said estimated halftone cell shift parameter, identifying all halftone cell full dot patterns contained within the halftone digital image, determining the correspondence of said halftone cell full dot patterns with said set of halftone cell threshold values to produce a fully defined halftone screen.

4. The method of claim 3 wherein the step of estimating the halftone cell dimensions in both a first and second direction, the halftone cell shift parameter and the set of halftone cell threshold values comprises the steps of:

using a mathematical technique to estimate an autocorrelation function for the halftone digital image, analyzing said autocorrelation function to locate a plurality of dominant non-origin peaks within the function, estimating the dimension of the halftone screen in both a first and a second direction based on the locations of said plurality of dominant non-origin peaks, determining the shift parameter of the halftone screen based on the relative position of said plurality of dominant non-origin peaks, and generating a set of all possible halftone cell threshold values based on a number of halftone threshold levels as determined by the product of said dimension in a first direction and said dimension in a second direction.

5. The method of claim 3 wherein the step of identifying all full dot patterns contained within the halftone digital image comprises the steps of:

identifying all unique halftone cell dot patterns contained within the plurality of halftone cell segments, determining the frequency of occurrence of each of said unique halftone cell dot patterns, and selecting certain of said unique halftone cell dot patterns as halftone cell full dot patterns based on the frequency of occurrence of said unique halftone cell dot patterns and a predetermined selection scheme.

6. The method of claim 3 wherein the step of determining the correspondence of said halftone cell full dot patterns with said set of halftone cell threshold values comprises the steps of:

(1) selecting a first halftone cell full dot pattern of level K, (2) selecting a second halftone cell full dot pattern of level K+1, (3) determining a halftone cell dot position that distinguishes said first halftone cell full dot pattern from said second halftone cell full dot pattern, (4) assigning a threshold value to said halftone cell dot position, said threshold value determined by selecting the K+1 element from said set of halftone cell threshold values, and (5) repeating steps (1-5) for all of said halftone cell full dot patterns to determine the halftone cell threshold value associated with each of said halftone cell dot positions.

7. The method of claim 2 wherein the step of logically filtering the plurality of halftone digital image pixels includes the steps of:

(1) assigning an initial continuous tone range to each halftone digital image input pixel based on the state of the halftone digital image pixel, (2) selecting a first filtering orientation which will define the direction for the logical filtering operation, (3) selecting a first halftone digital image pixel and a second halftone digital image pixel within a relative neighborhood of said first pixel, (4) analyzing said range of a first halftone digital image input pixel with respect to a second halftone digital image input pixel, (5) detecting the intersection of said ranges of said first and second pixels, (6) establishing a reduced continuous tone range equivalent to the intersection of said continuous tone ranges of said first and second pixels, (7) assigning said reduced continuous tone range to said first pixel, (8) repeating steps (3-7) for each halftone digital image input pixel, (9) repeating steps (3-8) using all possible relative neighboring pixels,

(10) repeating steps (3-9) until the continuous tone range of each individual pixel converges to a point when further iteration of the previous steps no longer reduces the continuous tone ranges of the pixels, and

(11) repeating steps (3-10) in a second filtering orientation to arrive at a minimal continuous tone range for each image pixel.

8. In a system for manipulating digital halftone images represented by a plurality of pixels, each pixel having a binary state generated by the conversion of an original continuous tone digital image into a halftone digital image through the application of a halftone screen to the original continuous tone image, the halftone screen having parameters which characterize the halftone screen, including; dimensions, a shift parameter and a set of cell threshold values, which define the cell, the system having a memory for digitally storing the halftone image pixels, a method of reconstructing a continuous tone digital image from a halftone digital image comprising the steps of:

estimating the halftone screen parameters used in the creation of the halftone digital image, logically filtering the plurality of halftone digital image pixels to arrive at a minimal range of potential continuous tone image values for each of said pixels, determining a continuous tone output value associated with each of said pixels based on said minimal range of potential continuous tone values, and assigning each of said continuous tone output values to a corresponding pixel within the reconstructed continuous tone digital image, and refining said reconstructed continuous tone digital image to reduce any quantization effects introduced in the original half-toning process.

9. In a system for manipulating digital halftone images represented by a plurality of pixels, including a means to reconstruct a continuous tone digital image from a halftone digital image, said halftone digital image having been created by the application of a halftone screen to an original continuous tone image, the halftone screen having parameters which characterize the halftone screen, including; dimensions, a shift parameter and a set of cell threshold values, which define the cell, a method for determining an optimum logical filtering orientation, including the steps of:

estimating the halftone screen parameters used in the creation of the halftone digital image, logically filtering the halftone digital image in a first filtering orientation and reconstructing a continuous tone digital image based on the ranges generated by said first filtering orientation, logically filtering the halftone digital image in a second filtering orientation and reconstructing a continuous tone digital image based on the ranges generated by said second filtering orientation, and analyzing the continuous tone digital output images generated by said first and second filtering orientations to determine the filtering orientation which best preserves the edge information of the original image.

* * * * *